Nov. 21, 1933. C. E. HAMILTON, SR Re. 19,004
FLATWORK IRONER
Original Filed June 28, 1929 3 Sheets-Sheet 1
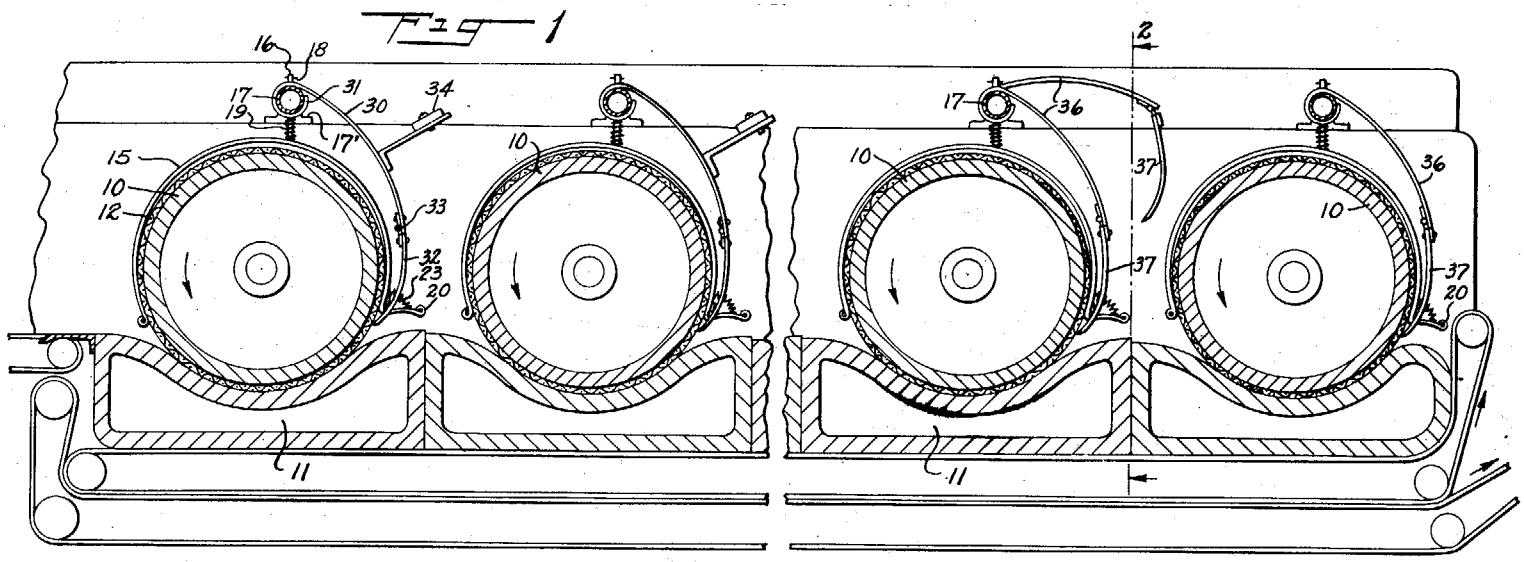
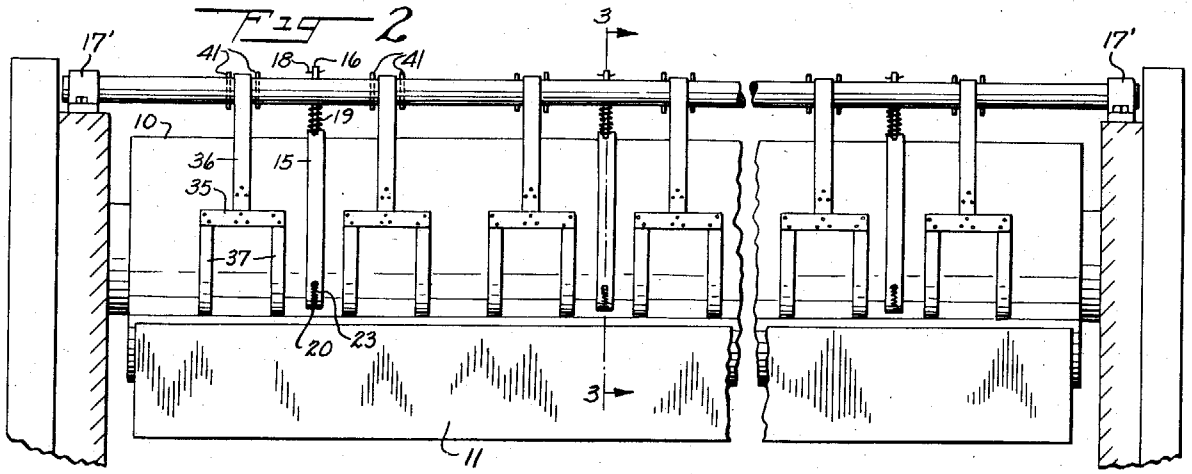
INVENTOR.
Charles Edwin Hamilton, Sr.
BY
ATTORNEY Nov. 21, 1933. C. E. HAMILTON, SR Re. 19,004
FLATWORK IRONER
Original Filed June 28, 1929 3 Sheets-Sheet 2
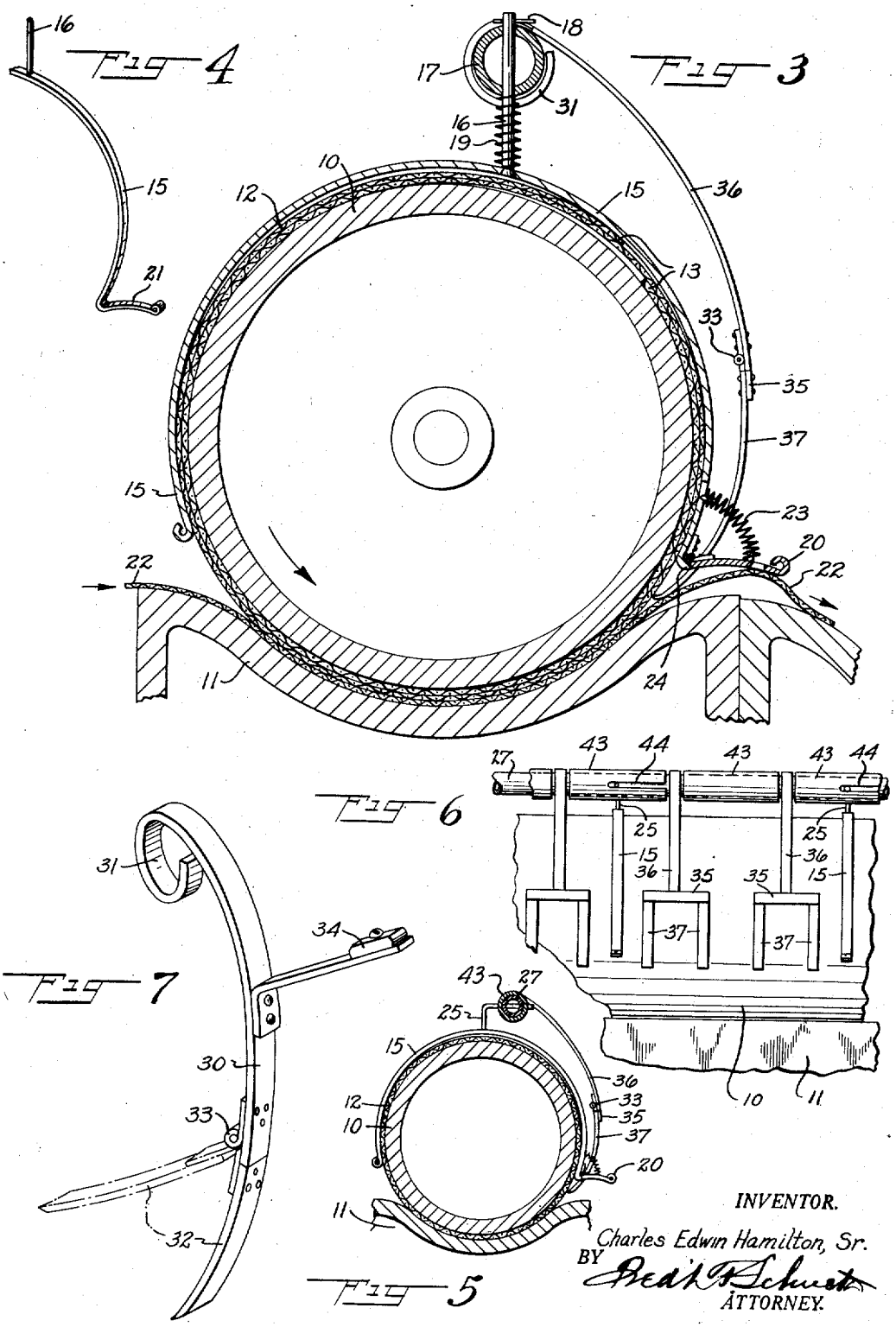
INVENTOR.
Charles Edwin Hamilton, Sr.
BY
ATTORNEY.

Nov. 21, 1933. C. E. HAMILTON, SR Re. 19,004

FLATWORK IRONER

Original Filed June 28, 1929 3 Sheets-Sheet 3

INVENTOR.
Charles Edwin Hamilton, Sr.
BY
ATTORNEY.

Reissued Nov. 21, 1933

BEST AVAILABLE COPY

Re. 19,004

UNITED STATES PATENT OFFICE 19,004

FLATWORK IRONER

Charles Edwin Hamilton, Sr., Hollywood, Calif., assignor to Edwin Lane, Percy Mendelson, and Charles Mendelson, all of New York, N. Y.

Original No. 1,867,741, dated July 19, 1932, Serial No. 374,477, June 28, 1929. Application for reissue March 21, 1933. Serial No. 661,932

15 Claims. (Cl. 68—9)

The invention relates to laundry and dry cleaner machinery, more especially to so-called flat work ironers of either the chest or cylinder type of ironer.

It has for its object to materially increase the life of the cover cloth of the rolls thereof, to enhance the effectiveness of such rolls, and to provide suitable stripper means for removing the work therefrom, so as to eliminate entirely the use of strings and like expedients for preventing wrapping of the work about a roll, and to afford, also, guide means for directing the work stripped from one roll to the succeeding roll. A further object of the invention resides in the arrangement of the rolls whereby the stretch of the work may be increased which is impossible, of course, when strings are employed.

In carrying out the invention, there is associated with the usual rolls of a flat work ironer suitable guard or binder members which are located longitudinally thereof at required intervals, the same being more or less semi-circular and extending over at least the exposed half of a roll to provide a guard and guide element thereat. To this end, they bear upon both the feed and delivery side thereof to insure the retention of the cover cloth firmly thereon as well as to prevent said cover cloth from dropping down or backwardly and passing in a folded condition under a roll. These guard members may, also, be provided with extensions or guide toes or like members projecting outwardly therefrom at the delivery side of a roll to engage with the issuing work and prevent the same from rising beyond a predetermined distance as well as serving to assist in carrying the work to the next roll. The guide toes, however, are arranged to yield in case of an unavoidable jam, either through the inherent elasticity of a carrying guard member or in being hingedly connected therewith.

In addition to these guard members, stripper members are located along the roll on its delivery side and, preferably, at each side of a guard member, said stripper members being normally yieldingly urged toward the surface of a roll and embodying movable or hinged stripper fingers which are designed to engage the delivered work and strip the same from its cover cloth, being capable of yielding, however, in the event of goods catching therein. By the provision of suitable stripper fingers and the guiding toes (which may also be associated with the stripper members rather than with the guard members), it becomes possible to dispense entirely with the strings usually employed for preventing wrapping of the work about a roll; and string marks and like defects in the work turned out by the ironer may thus be entirely eliminated. Moreover, a considerable saving not only in the strings themselves is thereby effected, but the labor of frequent replacement of strings and loss of time in the shut-down of the apparatus is obviated, as well as "turn-backs"; and a greater daily production becomes possible through the use of the novel ironing machine.

Furthermore, in view of the fact that all strings are eliminated, it is possible to progressively tension the work, as by increasing slightly the diameter of the rolls in the direction of work and progressively increase thereby the peripheral velocity of the successive rolls. The ability to stretch the work in process of drying and ironing admits of improvement in its quality, as well as in increase of the output, in that better contact is had between the work and its drying chest.

The nature of the invention, however, will best be understood when described in connection with the accompanying drawings, in which:

Fig. 1 is a fragmentary longitudinal section through a flat work ironer and illustrates the application of the novel guarding, guiding and stripping members thereto.

Fig. 2 is a transverse vertical section through the ironing machine, taken on the line 2—2, Fig. 1 of the drawings, and looking in the direction of the arrows.

Fig. 3 is an enlarged vertical section through a roll and guard member, taken on the line 3—3, Fig. 2 of the drawings, and looking in the direction of the arrows.

Fig. 4 is a fragmentary perspective view illustrating a modification in the combined guard and guide member.

Fig. 5 is a vertical section through a roll and portion of associated steam chest and illustrates a modification in the manner of mounting the guard member.

Fig. 6 is a fragmentary front elevation of a modified form of mounting for the stripper members.

Fig. 7 is a perspective view illustrating one form of the novel stripper member.

Fig. 10*a* is a similar view of a modification in

BEST AVAILABLE COPY the contacting edge, both figures being on a greatly exaggerated scale.

Figure 11:
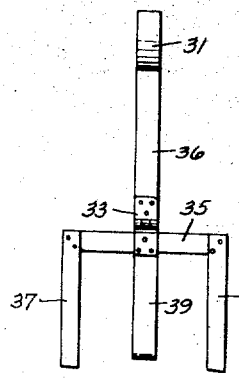
Figure 12:
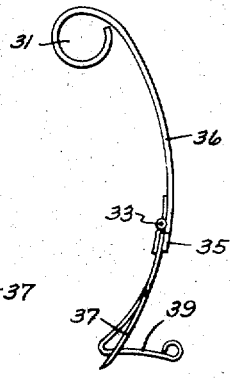

Figs. 11 and 12 are respectively a front and side elevation illustrating a combined stripper and guide member.

Figure 13:
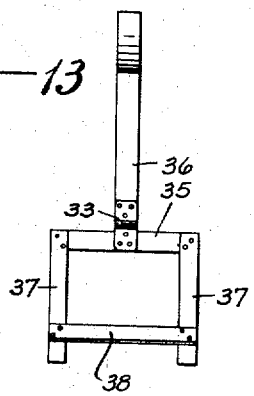

Fig. 13 is a front elevation illustrating a stripper member with reinforced fingers.

Figure 14:
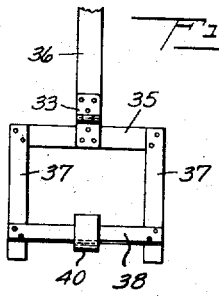
Figure 15:
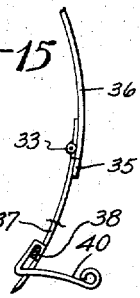

Figs. 14 and 15 are respectively a front and side elevation illustrating a further modification of combined stripper member and guide member.

Referring to the drawings, the invention is illustrated by way of example, as applied to an ironing machine of the chest type having a plurality of ironing rolls 10 adapted to iron flat work such as bed and table linen, etc., the rolls being journaled for rotation above a steam-heated chest 11, the surface of which immediately beneath each roll is generally concave to secure greater ironing contact. No claim is made to the apparatus per se, the same being of any well-known or special design and provided with standard mechanism (not shown) for rotating the individual rolls.

The individual rolls 10 are covered with a cloth covering 12 usually hair padding, wool padding or matted padding and which is frictionally held thereon by being wound thereover with lapped portion 13 to insure retention of the cover on the roll surface. Said cover cloth, particularly at the lapped portion 13, has a tendency to work away from the underlying cloth portion on the return travel, the lapped portion thus frequently breaking away and doubling over, or permitting the cover cloth as a whole to creep relatively to its support roll 10. This, of course, necessitates removal of the cover cloth from the particular roll in question and refitting of the same with a new cover or a reconditioned cover. Where the failure of the cover cloth 12 is not noticed immediately, this doubling may progress to a stage where the cover will be rendered unfit for further use.

In accordance with the invention, there is provided, substantially over the exposed portion of a roll and longitudinally along each individual roll, guard members 15, which are more or less semi-circular and designed to bear upon the cover cloth both at the delivery side of a roll as well as its entrance side; and the said guard members are preferably of resilient material and may be arranged, also, to be yieldingly urged toward the roll surface.

For example, there may be rigidly attached to a guard member 15 an upstanding pin 16 which is passed through a rod or tube 17 mounted in end bearings 17′ and disposed longitudinally over a roll 10. This pin slides freely in the tube, being held thereto by a cotter pin or the like 18, with a spring 19 coiled about said pin between the bottom of tube 17 and the guard 15 to normally direct the latter toward the cover cloth of the roll yet permitting the said guard member to yield should said cover cloth double upon itself or in any way jam. The guard member as a whole thus embraces substantially the exposed portion of the roll cover cloth, being curved to conform more or less to its surface and extending somewhat below the center of the roll for contact with said cover cloth. In being distributed at suitable intervals along the roll, the guard members eliminate any danger of the cover cloth dropping backwardly or folding upon itself as well as serving at the delivery portion of the roll to retain the same firmly thereon and thus assist the stripping action hereinafter set forth.

The portion of a guard member located at the delivery side, furthermore, is associated with an outwardly extending toe or guide member 20 which may be either integrally associated with the guard member, as indicated in Fig. 4 at 21, or, as shown in Fig. 3 of the drawings is hingedly connected thereto, to permit the toe to be pushed upwardly in case the work 22 should bunch or jam in some manner between rolls. A spring 23 normally urges the toe member toward the work 22 but its motion in this direction is limited and predetermined, as by providing a stop 24 to the hinge; and said guide members which are arranged longitudinally of a roll to cooperate with the guard members, thus serve to prevent the work 22 from rising upwardly too far and will also efficiently direct it to a succeeding roll.

As indicated in Fig. 5, the particular manner of mounting the aforesaid guard member and guide on its roll may be varied. For example, a projecting pin 25 therefrom may extend into a spacer sleeve 43 surrounding a rod or tube 27 corresponding to the tube 17, whereby any unusual pressure on the guard member will be taken up by the same rocking with the said tube 27.

In the provision of these guard members as well as in the provision of the guide members associated therewith, it becomes possible to provide for the ready stripping of the work from a roll on its delivery side, as the guard members afford a smooth surface of cover cloth for the stripper fingers to ride upon and the work peeled therefrom is prevented from rising unduly and is directed to entry at the next roll by said guide members which are located in proximity to the finger ends. To this end, stripper members are provided, preferably, upon each side of a combined guard and guide element; and these members may be variously formed but comprises generally a flexible or hinged element resting against the surface of a roll below a guide element and substantially at the point where the work 22 goes out of contact with the wall of the heating chest 11. A form of stripper member is inidcated in Fig. 7 of the drawings and comprises the body portion 30 with upper turned-over end to provide the eye 31 for slipping over rod or tube 17. At its lower portion there is hingedly connected to the stripper body a contact finger 32 bent slightly inwardly at its free edge toward the roll surface, the stripper member as a whole being freely oscillatable on tube 17 so that if any obstruction develops it may rise to accommodate the same; and by providing the hinge 33 intermediate the stripper member, it is possible to lift such finger and the member as a whole entirely free of a roll (see Fig. 1 of the drawings) clearing a succeeding roll. Ordinarily it would not be possible to thus swing a stripper member of the length required, as it would contact with a succeeding roll.

It has been found desirable, also, to provide a slight pressure on the stripper members associated with the earlier stages of the ironing operation, as the first two rolls thereof; and this may readily be accomplished by securing a suitable weight 34 to the body portion 30, as of a member such as is shown in Fig. 7. By the use of these strippers, it becomes possible to entirely eliminate strings and like expedients for preventing the wrapping of the work about a roll and especially so in connection with the associated guide element which prevents the work from rising unduly after having been stripped from a roll and then

Figure 10:
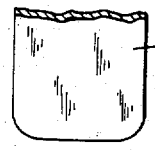
Fig. 10 is a fragmentary front elevation of one type of contacting edge of a stripper member.
Figure 10A:
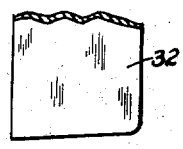
Figure 9:
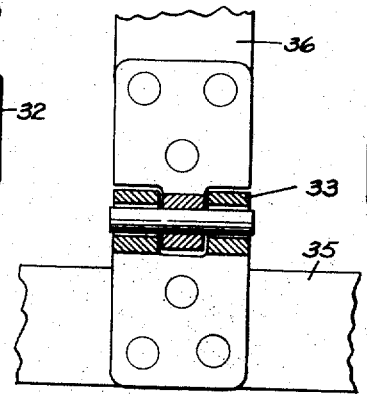
Fig. 9 is a vertical section through the hinging means for the stripper yoke.
Figure 8:
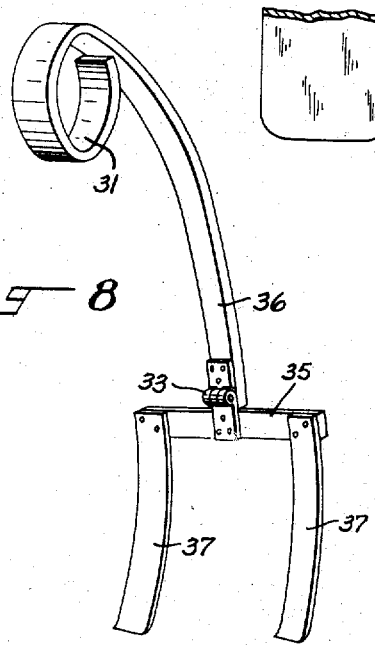
Fig. 8 is a similar view illustrating a modification therein.

BEST AVAILABLE COPY guiding the same to a succeeding roll. The stripping edge of the finger 32 may be variously formed but preferably with a shearing edge, that is to say, slightly inclined to the longitudinal axis of the finger or axis of a roll, as indicated in the various Figures 8, 11, 13 and 14 and as is shown on a greatly exaggerated scale, Fig. 10*a*. Or, it may be tapered slightly in both directions toward the middle of the finger, as indicated on a greatly exaggerated scale in Fig. 10 of the drawings.

Furthermore, a stripper member may comprise a plurality of fingers, as indicated in Figs. 8 and 13–15, and strippers of this type are preferably associated with the later rolls of a series. The stripper members with plurality of fingers may have a yoke 35 hinged to a body portion 36 of a stripper member, and from said yoke there are arranged to extend two or more fingers 37.

Figs. 13 and 14 illustrate a stiffening cross-piece 38 associated with a pair of fingers 37 while in Figs. 11–12 there is also shown associated with a yoke a guide element 39 similar to the guide member 21 which is then, of course, not to be associated with the corresponding guard member. Instead of being connected to the yoke 35 of a stripper member, a guide finger 40 may be secured to a stiffening cross-piece 38, Figs. 14–15.

As aforesaid, the stripper members are designed to be mounted upon the rod or tube 17 so as to oscillate freely thereon when obstruction is met with; and various expedients for properly spacing the stripper fingers along such tube may be resorted to. In Figs. 1 and 2 of the drawings, the stripper members are shown properly located by driving two pins 41 respectively upon opposite sides of the eye portion 31 of a stripper; while in Fig. 6, spacing sleeves 43 are secured about the tube 27 and located between the respective eyes of the different stripper members, said sleeves also being provided with an inwardly directed slot 44 to accommodate the mounting pin of a guard member.

By thus providing for the stripping of the work and guiding the same from one roll to the succeeding roll without the use of strings usually employed, it becomes possible to stretch slightly or apply tension to the work, increasing the same as the work progresses. This is readily accomplished by progressively increasing the diameter of the successive rolls 10 (this not being possible to indicate in the drawings as the actual differences are, of course, relatively small, being of the order of from $\frac{1}{32}$ to $\frac{1}{16}$ of an inch) and thereby increasing the peripheral velocity thereof so that an appreciable tension will be applied to the work passing through the apparatus. This particular feature in the operation makes also for improved quality of the work delivered, as well as increase of output, through the resulting closer contact between said work and its drying chest.

I claim:

1. In a flat work ironer, including ironing rolls with lapped cover cloth: a plurality of narrow, spaced guard members associated with each individual roll and extending transversely over substantially the exposed portion of a roll and bearing upon both the feed and delivery sides thereof to retain its cover cloth thereon.

2. In a flat work ironer, including ironing rolls with lapped cover cloth: guard members associated with the individual rolls, extending over substantially the exposed portion of a roll and yieldingly directed thereto to bear upon both the feed and delivery sides thereof to retain its cover cloth thereon.

3. In a flat work ironer, including ironing rolls with lapped cover cloth: resilient guard members associated with the individual rolls, extending over substantially the exposed portion of a roll and bearing upon both the feed and delivery sides thereof to retain its cover cloth thereon.

4. In a flat work ironer, including ironing rolls with lapped cover cloth: guard members associated with the individual rolls, extending over substantially the exposed portion of a roll, a support extending longitudinally of the roll above the same, said guard members each having a pin extending upwardly therefrom and slidably fitted within the support, and a spring about each of said pins between its guard member and the under-face of the support to yieldingly direct a guard member toward its roll and cause it to bear upon both the feed and delivery sides thereof to retain its cover cloth thereon.

5. In a flat work ironer, including ironing rolls with lapped cover cloth: guard members associated with the individual rolls, extending over substantially the exposed portion of a roll and bearing upon both the feed and delivery sides thereof to retain its cover cloth thereon, and guide toes connected with the respective guard members and extending outwardly therefrom at the delivery side for limiting the rise of work delivered by the roll.

6. In a flat work ironer, including ironing rolls with lapped cover cloth: guard members associated with the individual rolls, extending over substantially the exposed portion of a roll and bearing upon both the feed and delivery sides thereof to retain its cover cloth thereon, and yieldable guide toes carried by the guard members at one end and positioned between the rolls for limiting the rise of work delivered by the roll.

7. In a flat work ironer, including ironing rolls with lapped cover cloth: guard members associated with the individual rolls, extending over substantially the exposed portion of a roll and bearing upon both the feed and delivery sides thereof to retain its cover cloth thereon, and guide toes hingedly connected with the respective guard members and extending outwardly therefrom at the delivery side for limiting the rise of work delivered by the roll.

8. In a flat work ironer, including ironing rolls with lapped cover cloth: guard members associated with the individual rolls, extending over substantially the exposed portion of a roll and bearing upon both the feed and delivery sides thereof to retain its cover cloth thereon, guide toes hingedly connected with the respective guard members and extending outwardly therefrom at the delivery side for limiting the rise of work delivered by the roll, and a spring urging each guide toe toward the work a predetermined extent.

9. A member for stripping material from a roll, comprising a stripper finger mounted along the delivery side of the roll, and a contact finger hinged to the lower end of the stripper finger and bearing normally upon the surface of the roll.

10. In a flat work ironer, including ironing rolls with lapped cover cloth: stripper members associated therewith along the delivery side of a roll and having a hinged contact finger with its outer edge normally bearing upon the roll surface, the said edge being inclined to the axis of rotation of the roll.

11. In a flat work ironer, including ironing rolls with lapped cover cloth: stripper members

BEST AVAILABLE COPY associated therewith along the delivery side of a roll and each comprising a hinged yoke carrying a plurality of fingers normally bearing upon the roll surface.

12. In a flat work ironer, including ironing rolls with lapped cover cloth: a tube extending longitudinally of a roll above the same, and stripper members loosely mounted thereon, extending over the delivery side of the roll and having a hinged contact finger normally bearing upon the roll surface.

13. In a flat work ironer, including ironing rolls with lapped cover cloth: a tube extending longitudinally of a roll above the same, and weighted stripper members loosely mounted thereon, extending over the delivery side of the roll and having a hinged contact finger normally bearing upon the roll surface.

14. In a flat work ironer including a frame, a heat chest mounted thereon, clothed ironing rolls rotatably mounted in the frame above the heat chest, resilient means including a plurality of unitary guard and guide members associated with each of the individual rolls, a common support for said means extending longitudinally of a said roll, said guard members serving to engage the surface of the clothed roll to prevent flapping back of the cover thereof, and the guide members serving to prevent the goods from rising unduly upon delivery from a said roll and direct the same thence to the nip of the next succeeding roll, and each of the guide members constituting a terminal element of said resilient means.

15. In a flat work ironer including a frame, a heat chest mounted thereon, clothed ironing rolls rotatably mounted in the frame above the heat chest, resilient means including a plurality of unitary guard and guide members associated with each of the individual rolls, a common support for said means extending longitudinally of a said roll, means for yieldingly positioning thereon the unitary guard and guide members at intervals longitudinally of such roll, said guard members serving to engage the surface of the clothed roll to prevent flapping back of the cover thereof, and the guide members serving to prevent the goods from rising unduly upon delivery from a said roll and direct the same thence to the nip of the next succeeding roll, and each of the guide members constituting a terminal element of said resilient means.

CHARLES EDWIN HAMILTON, SR.